(12) United States Patent
Drane et al.

(10) Patent No.: US 8,024,276 B2
(45) Date of Patent: Sep. 20, 2011

(54) METHOD FOR INTERACTIVE LEARNING AND TRAINING

(75) Inventors: Douglas Drane, Austin, TX (US); Paula Fracasso, Austin, TX (US); David Rowland, Austin, TX (US)

(73) Assignee: Drane Associates, LP, Austin, TX (US)

( * ) Notice: Subject to any disclaimer, the term of this patent is extended or adjusted under 35 U.S.C. 154(b) by 5 days.

(21) Appl. No.: 11/419,317

(22) Filed: May 19, 2006
(Under 37 CFR 1.47)

(65) Prior Publication Data
US 2007/0112710 A1 May 17, 2007

Related U.S. Application Data

(60) Provisional application No. 60/684,198, filed on May 24, 2005.

(51) Int. Cl.
*G06F 17/00* (2006.01)
*G06N 5/00* (2006.01)
(52) U.S. Cl. ........................................................ 706/45
(58) Field of Classification Search ........................ None
See application file for complete search history.

(56) References Cited

U.S. PATENT DOCUMENTS

| 5,249,967 | A | * | 10/1993 | O'Leary et al. | 434/247 |
| 5,533,181 | A | * | 7/1996 | Bergsneider | 345/473 |
| 5,857,855 | A | * | 1/1999 | Katayama | 434/247 |
| 5,961,333 | A | * | 10/1999 | Harrison et al. | 434/322 |
| 6,126,449 | A | * | 10/2000 | Burns | 434/252 |
| 6,504,990 | B1 | * | 1/2003 | Abecassis | 386/46 |
| 2002/0059376 | A1 | * | 5/2002 | Schwartz | 709/204 |
| 2002/0106622 | A1 | * | 8/2002 | Osborne et al. | 434/350 |
| 2003/0027121 | A1 | * | 2/2003 | Grudnitski et al. | 434/308 |
| 2005/0202871 | A1 | | 9/2005 | Lippincott | |
| 2007/0112710 | A1 | * | 5/2007 | Drane et al. | 706/45 |

OTHER PUBLICATIONS

Office Action dated May 5, 2009, U.S. Appl. No. 11/419,324, filed May 19, 2006 entitled "System and Method for Authoring and Learning".

* cited by examiner

*Primary Examiner* — Omar F Fernandez Rivas
*Assistant Examiner* — Peter Coughlan
(74) *Attorney, Agent, or Firm* — Marger Johnson & McCollom, P.C.

(57) ABSTRACT

Provided is a method comprising delivering a video of an event to a learner that includes a still menu that effectuates and simulates a pause; recording a video of an action by the learner in response to the event; presenting to the learner the video of the action by the learner; presenting to the learner a video showing a preferred action by a master in response to the event; and recording at least one additional action by the learner. Also provided is a method for teaching a learner how to respond to an event comprising allowing the learner to choose among recording an action in response to a video of an event, viewing one or more recorded actions of a master, and comparing the two videos; wherein recording may be chosen before and after either or both viewing and reviewing, and the recordings are viewable as videos on a monitor.

3 Claims, 3 Drawing Sheets

METHOD FOR INTERACTIVE LEARNING AND TRAINING

CROSS-REFERENCE TO RELATED APPLICATION

The application claims the benefit of priority under 35 U.S.C. §119(e) from U.S. Provisional Application No. 60/684,198, entitled, "Method and System for Interactive Learning and Training," filed on May 24, 2005, which disclosures are incorporated herein by reference.

BACKGROUND OF THE INVENTION

The present invention herein relates generally to a method and system for interactive learning. More specifically, a method and system for learning in which the learner is recorded during strategically-placed pauses in the training video. The pauses provide opportunities for interactive action, modeling the master, thought, discussion, commentary and review, and the recording provides a record of those events that can be reviewed interactively as shown in the diagram.

DESCRIPTION OF RELATED ART

There is a need for an easy, inexpensive way to make learning experiences available through inexpensive and easily replicable digital media such that high-value, pertinent, and expert instruction can be provided to a wide audience. While various software applications have the flexibility to be developed with the intermittent pauses that drastically increase the understanding and retention of the training being provided, few, if any, of the methods employed in the current incarnation of the invention are acceptable in current software specification. In other words, the methods employed are work-around methods that fundamentally change the command and control structure of the media players/recorders working in harmony and synchronicity, yet independently. These methods are not currently known or accepted in the industry standard.

BRIEF SUMMARY OF THE INVENTION

Provided is a method for training/learning comprising delivering a situation to a learner, the situation comprising an event; automatically inserting a still menu in order to simulate a pause in the delivering; while pausing, recording an action by the learner in response to the event; the learner reviewing the action recorded by the learner; and presenting to the learner a preferred action by a master in response to the event. The method may further comprise resuming delivering on command of the learner. In various embodiments, delivering, pausing, resuming, and presenting comprise playing a series of motion menus and still menus. Further, delivering, pausing, presenting, recording, reviewing, and resuming are capable of being carried out simultaneously. In some embodiments, delivering a situation and presenting a preferred action comprise playing a motion menu in its entirety. The method may further comprise storing recordings where storing may comprise automatically associating a stored recording with the situation/event to which the recording relates, thus facilitating later retrieval. Recording may comprise recording a plurality of different, learner-controlled recordings associated with a situation.

A further method is provided comprising alternating between a motion menu and still menu in order to simulate a pause in a video where the background of the still menu is the same as the last frame of the motion menu; and during the pause, recording a learner's action in response to an event delivered in the video. Also provided is a system for training and learning comprising a learner video delivery tool; a video delivery medium; a learner control; an interactive pause; and a learner video recording tool.

Yet another method is provided comprising delivering a situation to one or more learners via a media player on a computer monitor, the situation comprises a plurality of events carried out by a plurality of situation participants and masters; after occurrence of an event, recording one or more actions by the learner in response to the event; reviewing one or more recorded actions by the learner; and presenting to the learner one or more preferred actions by one or more masters in response to an event.

BRIEF DESCRIPTION OF THE DRAWINGS

In the following detailed description of embodiments of the invention, reference is made to the accompanying drawings, which form a part hereof, and in which is shown by way of illustration specific exemplary embodiments in which the invention may be practiced, and in which like numbers represent the same or similar elements and one or a plurality of such elements, as follows.

DETAILED DESCRIPTION

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections. It is further noted that all functions described herein may be performed in either hardware or software, or a combination thereof, unless indicated otherwise.

Introduction

Figure 1:
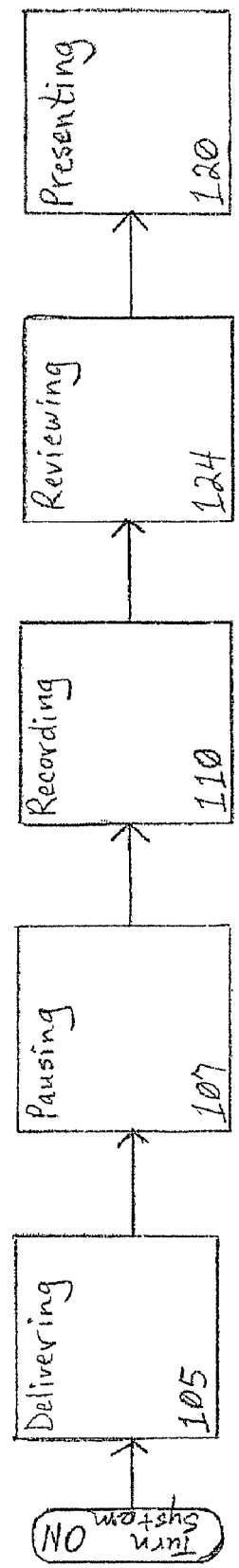
FIG. 1 is a flow diagram illustrating a training and learning method in accordance with embodiments of the present invention.

FIG. 1 is a flow diagram illustrating a method 100 for training/learning in accordance with embodiments of the system and method for interactive learning and training. Carrying out the method comprises delivering 105 an event to a learner; automatically inserting 107 a still menu in order to simulate a pause in the delivering 105; while playing the still menu, recording 110 an action by the learner in response to the event; optionally reviewing 124 the action recorded by the learner; and optionally presenting 120 the learner with a preferred action as carried out by the master in response to the event. In various embodiments, the method may comprise interactively repeating one or more stages of the process comprising delivering 105, pausing 107, recording 110, reviewing 124, and presenting 120.

In many embodiments, the method may comprise recording 110 a plurality of different learner actions associated with an event, each action immediately reviewable 124 by the learner and optionally associated with a plurality of preferred actions (models to be emulated) presented 120 to the learner as carried out by the master. After presenting 120 the learner with a preferred action, the learner may proceed through multiple iterations of recording 110 and reviewing 124 in an effort to more closely emulate the preferred action. In such embodiments, the method will comprise automatically or manually storing (not shown) the recordings 110 of different versions of learner actions, for instance in different electronic data files, such that the actions are retrievable in association with the related event.

Further, the learner may be able to interactively control the order of recording 110, reviewing 124, and presenting 120. For example, if an event presents a particularly difficult problem, the learner may have the option to elect presenting 120 a preferred action by the master, in order to gain an idea of a suitable action, before carrying out recording 110 of the learner's action. The method may further comprise delivering a sequence of different events related to a common training/learning goal, where the events may each be associated with a plurality of learner actions, reviews, and preferred actions.

DEFINITIONS

The system and method for interactive learning and training has the ability to capture the subtleties involved in human interaction such that learners can operate on all the levels available to the human being. Those areas are defined as gross, subtle, and causal bodies operating in self, society, and nature.

The "gross body" is the physical, corporeal body that can be seen and touched. Gross body characteristics include, but are not limited to, eye movement, eye contact, openness of eyes, lines around the eyes (wrinkles, or "crow's feet") and changing the eye level between master and subject, eyebrows, multiple positions, facial expression, smiles or frowns (whether lips are turned up or down) and the way other details of the lips and corners of the lips at the cheeks change shape and color, where the face is aligned with the subject, body expression, body levels between master and subject (is the master positioned above, aligned, or below the face of the subject), leaning forwards, leaning backwards, stooping or stretching, shoulder and hand position, open hands or fists, soft hands or hard, sitting or standing, cross legged or feet aligned, and the position of the body in the chair, breath rate, breath pauses or forces, and depth of breath.

The "subtle body" is the energetic field within and surrounding the human body, documented to exist by electrocardiograph and other biofeedback techniques, that extends beyond the gross body to a range of a few inches or more across the human species. Energetic fields have been documented to entrain the interaction between people or cause a disruption in human interaction. The subtle body may also be defined as the energy on words and with which language is delivered. Subtle body characteristics may include the energy level of the master's movement, light surrounding the bodies, intensity, the energetic body field and the lightness or heaviness of the bodies, the emotion and feelings of the subjects, the master, the emotional presence in the room, the openness of the people in the video, the positive or negative regard between the people in the room, the positive or negative expectations, and the presence of affection or not between the players. In other embodiments, biofeedback techniques may be used to collect additional biological data that is indicative of a player's state of mind/mood. Non-limiting examples of such biological data are: heart rate variability; heart rate; skin resistance; skin temperature; breathing rate; oxygenation level.

The term "causal body" describes the intention behind the actions and responses, the purpose, the appreciation expressed, expectations present, authenticity, and authentic alignment with the values and purpose of the individual; the focus of the interaction within the deepest level of knowing, the intuition-connected or spiritual aspect in every human being. This aspect of the human being has been measured to exist by biofeedback techniques and functional MRI. When this intention is set, different neural pathways and brain areas light up in the functional MRI showing specific and verifiable brain activities supporting the intention. Some evidence also exists demonstrating that changes in a person's intent affect situational outcome.

As for speech, the learner can notice and model the master's voice tone, pitch, format, intensity, jitter, shimmer, voice breaks, excitation pattern, articulatory synthesis, cadence, word emphasis, word pattern, speech rate, and variation of speech, and diction.

While some of these areas like intention and energy fields are often felt or sensed in real human interaction, these feelings cannot be experienced through the video. However, the impact of these areas can be seen on the video, and sensed or intuited by the learner and incorporated into the modeling or mentor feedback so that people can be trained in self worth, well being, intentionally and causality, empowerment, will and determination, and action drive. The objective of adding this perspective to the learning station is to raise the effectiveness of the learner when applying the knowledge in actual situations.

Control

Another aspect of the system and method for interactive authoring and learning is a control. In various embodiments, the control is a remote control, a keyboard, a keypad, an adapted game controller, a computer mouse, buttons on a screen, or combinations thereof. In some embodiments, the remote control consists of 4 buttons. The remote control may reduce the number of commands, thus making the control easily understood, accessed and used. Consequently, a learner can focus full, undivided attention on the master and learning with little distraction caused by necessary entering of commands. This easy and transparent command and control system greatly increases the focus of the learner and minimizes distractions.

In various embodiments, the control may carry out rewinding, forwarding, frame freezing/still, skipping forward, skipping back, super high speed rewinding and fast forwarding, super high speed skipping forward and back, variable slow motion speeds, variable fast motions speeds, and any number of various command combinations may be programmed into the control as appropriate. The media played, e.g.—a video, may be broken up and organized into easily navigable parts, such as chapters and paragraphs in a book, that allow a learner/author to jump to a desired point in media being played. In some embodiments, a video is broken down into episodes, sections, segments, and elements. By analogy, a situation is to an element like a chapter in a book is to a sentence. Thus, a learner/author may use the skip or other options on the control to jump across situations/events in order to get to a point of interest in a video, like using a table of contents in a book.

Pauses

Figure 2:
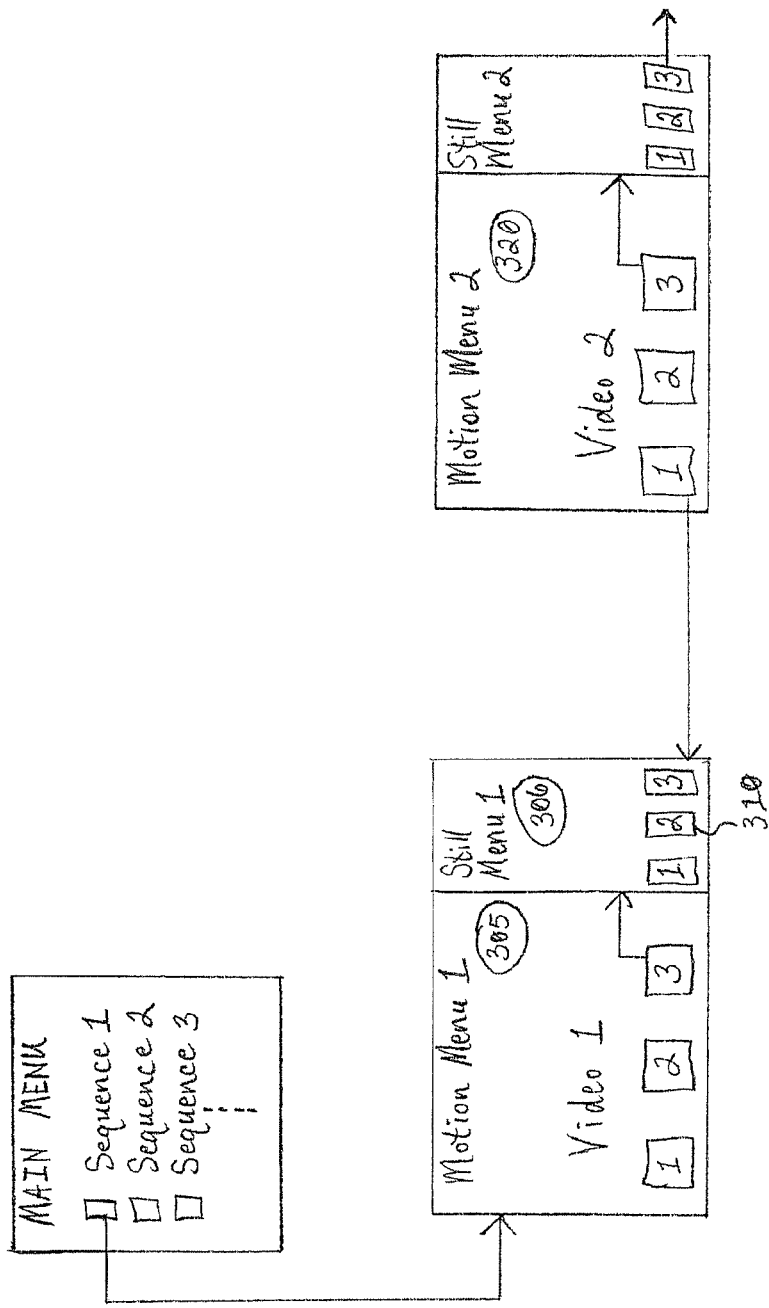
FIG. 2 is a depiction of movement between videos using a control in accordance with embodiments of the present invention.

In various embodiments illustrated by FIG. 2, a "pause" is created by inserting a still menu 306/326 between motion menus 305/320 using the last still frame of a video as the still menu background. Remote control buttons 1, 2, and 3 (not shown) can be made to correlate to invisible onscreen buttons 1, 2, and 3 of the still menu and motion menu. Button 4 on the remote control can be set to allow an exit to the main menu at any point during playing.

In embodiments where a pause is created by inserting a still menu between motion menus, the pause is thus a simulated pause. In some embodiments, a pause is accomplished via motion menus and still menus where, as described, a still menu is inserted between motion menus using the last still frame of the video as the still menu background, which in at least some embodiments is overlaid with invisible onscreen buttons. Therefore, the entire video is comprised of motion menus and still menus. All video is actually displayed as the background of the various motion menus. This methodology, when combined with a suitable remote control and invisible onscreen buttons, comprises a workaround to the standard specification. Such a workaround greatly increases ease of use for a learner.

Methods of carrying out a pause may be more fully understood by reference to FIG. 2. The first portion of video 1 to be viewed is placed on motion menu 1 305, which has invisible onscreen buttons 1, 2, & 3 that are overlaid on the screen. The invisible onscreen buttons 1, 2, & 3 can correspond to buttons on a remote control (not shown). After motion menu 1 305 plays through its entirety, an action is auto-executed to jump to still menu 1 306 which is, in actuality, the last frame of motion menu 1 305, thus simulating a pause. Still menu 1 306 also has invisible onscreen buttons 1, 2, & 3 overlaid that correspond to buttons on a remote control. Upon the viewer activating invisible button 2 310 on still menu 1 306 by pressing remote control button 2 310, an action is executed so that the video will jump to motion menu 2 320 (the first frame of motion menu 2 320 is the background for still menu 1 306, thus creating a seamless transition into motion menu 2 320) and the second portion of the video to be viewed is placed on motion menu 2 320, and so on.

In the embodiments of FIG. 2, motion menus include three invisible buttons of which two of the buttons (1 and 3) are auto-activated (they are used to review the skip clips) and the other button (2) is the default button that is landed on upon entry into the still menu. The default buttons on a motion menu may have no action assigned to them. Upon activation of button 1 (e.g.—pressing button 1 on a control) on the motion menu, the video jumps to the still menu that was last played. Upon activation of button 3 (e.g.—pressing button 3 on the remote control) on the motion menu, the video jumps to the next still menu in the sequence.

Still menus can remain on the screen indefinitely until a further command is selected, e.g.—pressing a button on a remote control. Still menus can include three invisible onscreen buttons (and a still image background of the last frame in the last played motion menu), of which two of the buttons (buttons 1 and 3) are auto-activated (they are used to review the skip clips) and the other button (button 2) is the default button that is landed on upon entry into the still menu. The default buttons on still menus do have an action assigned to them which is to jump to the next motion menu in the sequence. Upon activation of button 1 (e.g. pressing control button 1) on a still menu, a video jumps to the beginning of the motion menu that was last played. Upon activation of button 3 (e.g. pressing button 3 on a control) on still menus the video jumps to the beginning of the next motion menu in the sequence. As discussed previously, upon activation of button 2 on a still menu, the video (e.g.—DVD) may jump to the beginning of the next motion menu in the sequence.

In embodiments, each motion menu is set to cycle one time so that the video plays on release of the still menu button one time and does not repeat. In addition, each menu button is made invisible and some are auto-activated for purposes of seamless navigation throughout the scene. By formatting menu buttons in this manner, when a video is played, the first menu button upon release will play the portion of the movie associated with that button one time and then pause. The video will be the full size of the screen because the menu button is invisible. Once the menu pauses, the user can push a button corresponding to the play button on the control which will execute the action associated with the play button. Once again, the play button is invisible so it does not appear that the video was playing within a small frame but that the video is the entire screen size. This process may repeat itself as necessary to complete the entire video.

FIG. 3

Figure 3:
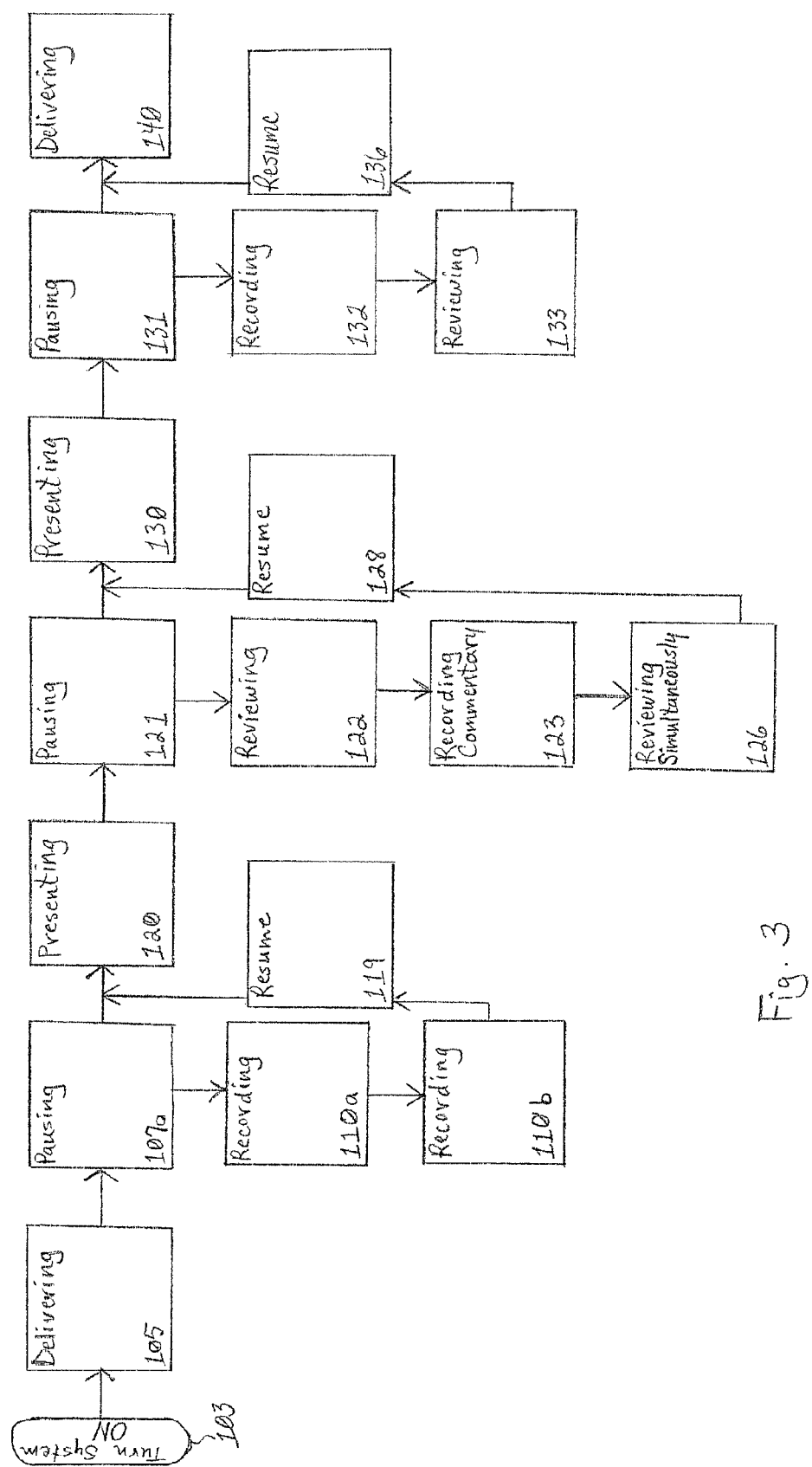
FIG. 3 is a flow diagram showing another training and learning method in accordance with embodiments of the present invention.

FIG. 3 is also a flow diagram illustrating a method 200 for training and learning in accordance with embodiments of the present invention. A non-limiting example of an application of the method for training and learning may be training of teachers via video. Such a setting in a training video may be useful for a learner who is a school teacher and who is interested in improving teaching skills. The teacher/learner in this case would view the video, which could, for example, be a classroom setting including children and a model teacher, i.e.—master. In this case the teacher appearing with the children in the video would be considered a master for purposes of the training/learning video. Once the embodiment of the method in FIG. 3 is turned on 103, the method comprises delivering 105 an event to the learner/teacher, for example, one of the children posing a question to the master/model teacher. After delivering 105 the event, the video automatically enters a pausing 107 stage and the learner would have time to take in and consider the circumstances prior to recording 110, etc.

The exact timing of the pause 107 may be pre-set by an author to be automatically carried out directly after delivering 105 the event. Pausing 107 permits the teacher to record 110*a* a first response to the event and a second response 110*b* to the event. In alternative embodiments, the teacher, as desired, may record multiple different responses or attempted improvements on the same response. After recording 110*a*/110*b* responses, the teacher/learner may then elect to resume 119 the video, which automatically presents 120 the model teacher's preferred action. The duration of a pause 107 and specific steps taken during the pause 107 may be controlled by the learner.

After presenting 120 the model teacher's preferred action, the video may again automatically pause, giving the learner the opportunity to review 122 the recorded 110*a* and/or 110*b* actions as compared to the master's preferred action that was presented 120. The learner may also have the option to record commentary 123 based on impressions of, for instance, the presented 120 master's preferred action and review 122 of the prior recorded 110*a*/110*b* actions. Reviewing 122 recordings 110*a*/110*b* allows the learner to study whether the master's preferred action was modeled in all aspects, even including such subtleties as voice tone, pace, body language, and eye contact as described more fully above.

In an alternative embodiment, the flexibility and interactivity of the system and method may permit the learner to elect to simultaneously review 126 recorded actions 110*a*/110*b* and the master's preferred action that was previously presented 120. Further alternatives include the ability of the learner to elect to review the entire prior sequence of events including delivering 105, recording 110a/110b of actions, and presenting 120.

Once satisfied, the learner may elect to resume 128 auto play of the video, which may present 130 another version of a master's preferred action in response to the original event 105. After presenting 130 the second preferred action, the video may again automatically pause 131. The learner can then record 132 another action in response to the presentation 130 of the second preferred action, and review 133 the recorded 132 action. In other embodiments, subsequent recordings and reviews may be carried out during the pause 131 in an attempt to emulate the master's presentations 120/130.

Once satisfied, the learner may elect to resume 136 auto play of the video, which may proceed to the delivery 140 of a second event. Subsequent to delivery 140 of the second event, the learner may follow an action plan similar to that following delivery 105 of the first event. The embodiment of FIG. 3 delivers two events 105/140, but embodiments of the method of the present invention may involve from one event to a plurality of events, and from one to a plurality of actions in response to each event, as generally exemplified in the embodiments of FIG. 1 and FIG. 3. A sequence of related situations and events with associated actions may be combined to form a training/learning program. Actions associated with events include, for instance, one or more reactions to those actions, further actions, and corresponding actions and reactions.

Learning System Components

The components of a system in accordance with embodiments of the present invention comprise a delivery medium; learner delivery tool; learner recording tool; interactive pause; learner control; and, optionally, a re-recordable memory.

The learner delivery tool may be any device capable of delivering pre-recorded content to a learner. Even purely audio or purely visual (silent) training materials might be delivered to a learner. Non-limiting, examples of suitable delivery tools comprise televisions, digital or analog audio players such as CD or cassette players, video projectors, and computer monitors.

The delivery medium may be any medium capable of delivering training materials to a learner delivery tool. Non-limiting examples of delivery mediums include cable, such as cable for transmission of digital data, satellite or other wireless transmission mediums, or local devices such as a computer memory, CD, DVD, or cassette.

A learner recording tool may be any device capable of recording a learner's actions, even purely audio or visual actions. Non-limiting examples include digital and analog data recorders of any sort, such as CD and DVD recorders, and recorders coupled to an electronic computer memory, either via cable, wireless connection, locally, or remotely via the internet. In some embodiments, the learner delivery tool and learner recording tool may be components of the same device, such as a media player and recorder coupled to the same computer station where a learner may participate in training. The training may deliver the video via one screen on a computer monitor and a second screen on the same monitor may allow review of recordings of the learner where the recording device is also coupled to the same computer. Thus, for comparison purposes, a learner may simultaneously present a master's preferred actions and review the learner's recorded actions on side-by-side screens on the learner's computer. The system provides for delivery and capture of newly learned behavior and approaches easily and quickly.

A learner control and interactive pause may be a control and pause as described above. A suitable learner control may be any that simplifies use of the system and reduces distractions to the learner that would subtract from the learner's focus on the video content and consideration of actions in response to events. In various embodiments the learner control permits the learner to interactively control various stages of the training/learning process, such as initiating play of the video, recording and reviewing actions as desired, and subsequently resuming the video. The learner control may also give the learner control of presenting of master preferred actions for consideration, and may further permit the learner to skip forward and backward between/among stages and even sequences in a video.

In various other embodiments, the method and system comprise: delivering a situation to one or more learners via a media player on a computer monitor, the situation comprises a plurality of events carried out by a plurality of situation participants and masters; after occurrence of an event, recording one or more actions by the learner in response to the event; reviewing one or more recorded actions by the learner; and presenting to the learner one or more preferred actions by one or more masters in the response to an event. The delivering may be paused after occurrence of an event. The learner controls the order and timing of the delivering, recording, reviewing, presenting, and pausing. Commands from the learner include skipping forward and backward as desired among events, actions, and preferred actions.

Example

By way of example, consider a situation where a learner trains by viewing and listening to a situation via a training video. In this example, the situation in the video (e.g.—DVD) is a real, authentic business situation. Alternatively, a group of learners directed by a leader may similarly train by viewing and listening to such a training video. Both the learner delivery tool and learner recording tool are components of the same computer that includes a coupled monitor and audiovisual recording device. The learner delivery tool is any suitable media player and the audiovisual recording device in this case is a 'web cam'. Separate screens on the monitor display the training video and the learner's recorded actions. The learner can simultaneously control the two screens displaying the training video and recorded actions. For example, the learner may be skipping from a new recording to a previous recording for review while simultaneously playing, fast forwarding, rewinding or the like within the training video. In this instance the control is an adapted keyboard or keypad.

The training scenario is an actual, live sales meeting directed by a sales manager, who in this case will be the master. Participants in the meeting include: salesperson 1, salesperson 2, engineer, marketing, and accountant. The sales meeting is an actual sales meeting directed by a seasoned and respected sales manager, thus the participants are not actors and the learner is able to observe real situations and absorb not only what is said, but also the manner in which it is said, voice quality and volume, tempo, and inaudible factors such as body language, facial expressions, and the like.

The learner learns by observing an event and then in any order: recording a learner action in response to the event, observing a participant action in response to the event, and reviewing the learner's recorded action. In this case a participant action in response to an event may or may not be a preferred action by the master/sales manager.

As would be anticipated in such a meeting, each topic in the meeting is met with various responses from the various participants (the master may be defined as a participant for these purposes), in no certain order, based on their areas of expertise. An event may be one or more verbal responses, facial expressions, or gestures, or a combination of these by any number of the participants. After occurrence of any event (or action, reaction, or series of actions/reactions, by the master or any of the other participants), the learner may record one or more learner actions in response to the event. Note that as a learner moves from event to event (audible or not) in a situation, a participant's action in response to an event may then become an event to which the next participant action or learner action is directed.

Before recording a learner action, the learner may view the participant's (or master's) action/reaction in response to the event to get an idea of a suitable response. Then the learner records a learner action in response to the event, which may or may not emulate the participant's action in the response to the event. Examples of some recorded learner actions may be to repeat the exact words in the participant's action; paraphrase the words in the participant's action; partially paraphrase the words in the participant's action and also make independent learner inputs directed to the event; make only independent inputs directed to the event that do not emulate the participant's response; or create an entirely alternative response to the event. Alternatively, the learner may record a learner action "blind" without viewing the participant's action in response to the event. The learner may record any number of different learner actions in order to practice responding to an event, and even delete recordings if desired.

After recording, the learner may then or later review the recording for comparison to a participant's response to the event. After making a comparison the learner may record another learner action in order to further hone the learner's response technique.

Recordings are automatically saved so that they are associated with the related event. The system allows for any number of recordings to be made for an event. Thus, the learner may build a database of retrievable recordings associated with the various events in a situation. The system and control give the learner or someone reviewing the learner's work the power to jump among situations and events as desired when grading the learner or going back to a specific point in the training for further trials.

Because the learner has the ability to record and erase response actions, the learner is better able to be uninhibited and trusting of the learning process when going through it and, since there are no right answers in complex, known interactions, just better approaches, the system of the present invention encourages risk taking and trying again (and deleting old recordings as desired) to hone and perfect newly learned behavior and approaches.

Thus, a live meeting with continuous discussion by multiple participants can be broken up as desired into situations and events, or organized even further such as into episodes. The learner has full control to pause/stop the video of the meeting after any event to practice responding to the event, each response automatically recorded and saved for later retrieval in association with the related event. Further, the learner may at will skip forward or backward at various speeds within and among learner recordings and training video events (even simultaneously), not to mention varying playing speeds, in order to move to new or former scenarios of interest within the meeting setting.

The above description of illustrated embodiments of the invention is not intended to be exhaustive or to limit the invention to the precise forms disclosed. While specific embodiments of, and examples for, the invention are described herein for illustrative purposes, various equivalent modifications including those described above are possible within the scope of the invention, as those skilled in the relevant art will recognize. The teachings provided herein of the invention can be applied to other learning systems, not necessarily the interactive systems described above. The various embodiments above can be combined to provide further embodiments. In general, in the following claims, the terms used should not be construed to limit the invention to the specific embodiments disclosed in the specification and the claims, but should be construed to include all interactive learning and training systems. Accordingly, the invention is not limited by the disclosure, but instead the scope of the invention is to be determined entirely by the following claims, which are to be construed in accordance with established doctrines of claim interpretation.

What is claimed is:

1. A training method comprising:
   delivering a video of an event to a learner via a monitor, said video of an event including a still menu, said still menu effectuating and simulating a pause in said delivering;
   recording, after said learner has viewed said video of an event and during said simulated pause, a video of an action by said learner in response to said event;
   presenting to said learner said video of said action by said learner;
   presenting to said learner a video showing a preferred action by a master in response to said event; and
   recording at least one additional action by said learner, after said presenting to said learner a video showing a preferred action by a master in response to said event.

2. A method for teaching a learner how to respond to an event comprising:
   allowing said learner, in response to viewing a video of said event, to choose among:
      recording one or more actions of said learner in response to said event, viewing one or more recorded actions of a master in response to said event, and reviewing said one or more recorded actions of said learner in comparison to said one or more recorded actions of a master;
      wherein said recording may be chosen before and after either or both of said viewing and said reviewing; and
      wherein said event, said one or more recorded actions of said learner, and said one or more recorded actions of a master are viewable as videos on a monitor, said videos including at least one still menu capable of effecting said choosing, said at least one still menu simulating a pause.

3. A method for teaching a learner how to respond to an event comprising:
   delivering a video of an event to said learner;
   recording at least one action of said learner responding to said event as viewed by said learner in said video;
   presenting at least one recorded action of a master responding to said event;
   allowing said learner to review said at least one recorded action of said learner in comparison to said at least one recorded action of a master; and
   allowing said learner to record at least one additional action of said learner responding to said event or to view at least one additional recorded action of a master responding to said event;
   wherein said event, said at least one recorded action of said learner, and said at least one recorded action of a master are viewable as videos on a monitor, said videos including at least one still menu capable of effectuating said allowing, said at least one still menu simulating a pause.

* * * * *